United States Patent [19]

Baker

[11] Patent Number: 4,543,930
[45] Date of Patent: Oct. 1, 1985

[54] STAGED DIRECT INJECTION DIESEL ENGINE

[75] Inventor: Quentin A. Baker, San Antonio, Tex.

[73] Assignee: Southwest Research Institute, San Antonio, Tex.

[21] Appl. No.: 552,890

[22] Filed: Nov. 17, 1983

[51] Int. Cl.$^4$ .............................................. F02B 3/00
[52] U.S. Cl. .................................. 123/299; 123/300; 123/276
[58] Field of Search ............... 123/299, 300, 305, 276, 123/279, 575

[56] References Cited

U.S. PATENT DOCUMENTS

| | | | |
|---|---|---|---|
| 2,692,587 | 10/1954 | Barber | 123/299 |
| 2,960,079 | 11/1960 | Monnot et al. | 123/299 |
| 4,217,871 | 8/1980 | Ohashi et al. | 123/299 |
| 4,399,786 | 8/1983 | Holmer | 123/299 |
| 4,414,940 | 11/1983 | Lloyd | 123/300 |

FOREIGN PATENT DOCUMENTS

| | | | |
|---|---|---|---|
| 0012013 | 1/1979 | Japan | 123/276 |
| 2039607 | 8/1980 | United Kingdom | 123/300 |

OTHER PUBLICATIONS

Alternative Fuels for Medium-Speed Diesel Engines (AFFmSDE) Project Second Research Phase Final Report Synthetic Fuels, Alcohol Emulsions, Off-Specification Diesel Fuels and Methanol, Q. A. Baker, S. Ariga, and A. M. Alpert, Sep. 1981, (Note Pertinent pp. 119-123).

"The Effect of the Vigom Process on the Combustion in Diesel Engines", by Eyzat et al., SAE paper, Oct. 1964.

*Primary Examiner*—Parshotam S. Lall
*Attorney, Agent, or Firm*—Fulbright & Jaworski

[57] ABSTRACT

A diesel engine having staged injection for using lower cetane number fuels than No. 2 diesel fuel. The engine includes a main fuel injector and a pilot fuel injector. Pilot and main fuel may be the same fuel. The pilot injector injects from five to fifteen percent of the total fuel at timings from 20° to 180° BTDC depending upon the quantity of pilot fuel injected, the fuel cetane number and speed and load. The pilot fuel injector is directed toward the centerline of the diesel cylinder and at an angle toward the top of the piston, avoiding the walls of the cylinder. Stratification of the early injected pilot fuel is needed to reduce the fuel-air mixing rate, prevent loss of pilot fuel to quench zones, and keep the fuel-air mixture from becoming too fuel lean to become effective. In one embodiment, the pilot fuel injector includes a single hole for injection of the fuel and is directed at approximately 48° below the head of the cylinder.

4 Claims, 4 Drawing Figures

STAGED DIRECT INJECTION DIESEL ENGINE

The present invention was made in the course of a contract with the Department of Energy.

BACKGROUND OF THE INVENTION

As described in FRA Report No. FRA/ORD-80/40.11, entitled Alternative Fuels For Medium-Speed Diesel Engines (AFFMSDE) Project, Second Research Phase Final Report, Synthetic Fuels, Alcohol Emulsions, Off-Specification Diesel Fuels and Methanol, the concept of using staged injection, that is multiple injections for utilizing alternative low ignition quality fuels as a substitute for diesel fuel, is discussed. That is, injecting a small portion of the fuel early in the cycle to act as a pilot for the main fuel charge allows the use of fuels having lower cetane numbers than No. 2 diesel fuel. Staged injection is the injection of a fuel charge in two or more stages directly into a diesel engine combustion chamber for the purpose of producing smooth diesel engine combustion and high thermal efficiency while operating on poor quality fuels. The initial or pilot stage is injected early in the compression stroke to allow it sufficient time to undergo pre-flame chemical reactions before injection of the main charge. The main fuel charge is injected near to or at the end of the compression stroke. Combustion of the pilot stage begins before combustion of the main fuel charge starts. The heat released from combustion of the pilot stage aids in the ignition of the main fuel charge. The ignition delay period of the main charge can be controlled by varying the quantity and injection timing of the initial pilot stage. The use of an early injection of a small quantity of fuel to accomplish these results is described in the above report. However, simply injecting a small amount of fuel early, without regard for the fuel-air mixing process, leads to uncertain results. The present invention has found that the initial or pilot stage must be injected in such a manner that the fuel is maintained in the cylinder in a stratified form. The pilot fuel spray should be directed into the combustion chamber at an orientation which will prevent loss of fuels into quench regions or through liner wetting. Further, the orientation and timing must be such that stratification occurs in the combustion chamber producing local fuel/air ratios sufficiently high for combustion of the initial or pilot stage to proceed at a high rate. That is, it has been found that the early injection of pilot or initial stage fuel must (1) have limited mixing with the combustion chamber air during the period of time between the early injection event and the onset of combustion, (2) the pilot injection must not come in contact with cold walls or be trapped in quench regions of the combustion chamber which effectively stops the chemical reaction of fuel and air, (3) the pilot injection is placed along the longitudinal axis of the chamber where the mixing rate is reduced because the air velocity and turbulance of the rotation air in the combustion chamber is a minimum along this longitudinal axis, and (4) the center of the combustion chamber is the preferred location for injected pilot fuel as the temperature in the center of the chamber is higher than at the combustion periphery whereby the injection of the pilot fuel into the hotter cylinder reduces ignition delay.

SUMMARY OF THE PRESENT INVENTION

The present invention is directed to a staged direct injection diesel engine in which the initial or pilot stage is injected in such a manner that the fuel is contained in the cylinder in a stratified form. Furthermore, the pilot fuel is directed at an orientation which prevents loss of fuels into the quench regions or to liner wetting and is directed towards the centerline of the cylinder and at an angle toward the top of the piston. Preferably the injection of the fuel is placed along the longitudinal axis of the cylinder whereby the mixing rate between the air and the fuel is a minimum, but where the temperature is a maximum.

Another object of the present invention is the improvement in an injection system in a diesel engine using fuels having a lower cetane number than No. 2 diesel fuel in which the engine includes a main fuel injector and a pilot fuel injector which injects pilot fuel into the engine between 20° to 120° before top dead center in which the pilot fuel injection is directed toward the centerline of the diesel cylinder and at an angle to be directed toward the top of the piston but not onto the piston, avoiding the walls of the cylinder.

Still a further object of the present invention is wherein the pilot fuel is directed along the longitudinal axis of the cylinder.

Yet a still further object of the present invention is wherein the pilot fuel injector includes a single hole for stratifying the fuel.

Still a further object is wherein the pilot fuel injector is directed at approximately 48° below the head of the cylinder.

Other and further objects, features and advantages will be apparent from the following description of a presently preferred embodiment of the invention, given for the purpose of disclosure, and taken in conjunction with the accompanying drawings.

DESCRIPTION OF THE PREFERRED EMBODIMENT

The tests described herein were utilized on a two-cylinder version of the Electro-Motive Division Model 567B diesel engine and the low cetane number fuels tested were produced by blending a high aromatic naphtha with No. 2 diesel fuel, the resulting blends having cetane numbers of 30.8, 24.0 and 17.7. The engine was operated at various speed/load combinations that simulated the "notch" throttle operation of engines in line haul railroad locomotives.

Figure 1:
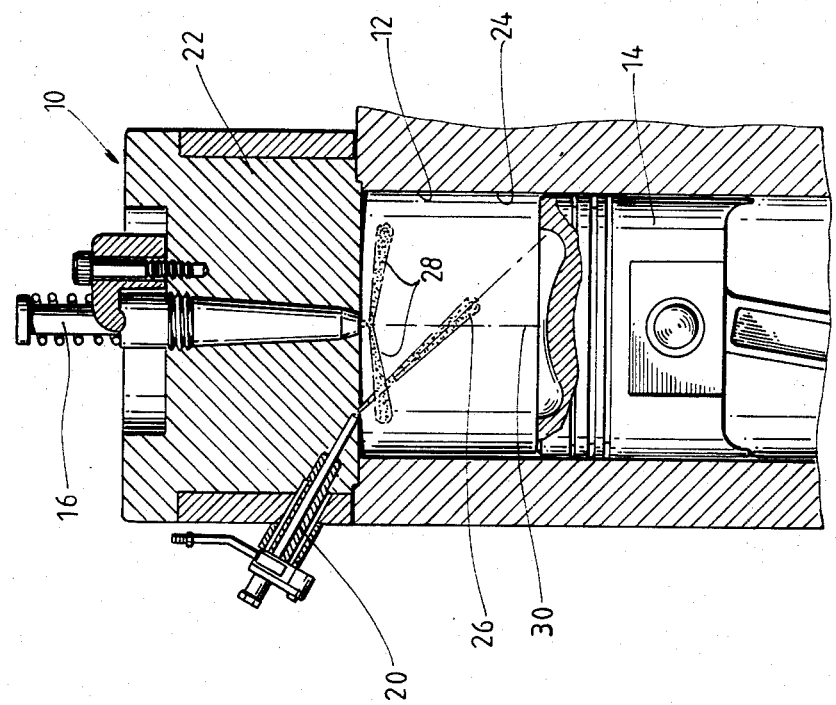
FIG. 1 is a fragmentary elevational view in cross section of one cylinder of a diesel engine illustrating the combustion chamber geometry of the present invention.

Referring now to FIG. 1, a diesel engine 10 is shown having a cylinder 12, in which a piston 14 moves, and a standard main fuel injector 16. A pencil type fuel injector nozzle 20 was provided in the head 22 of the engine for producing the initial or pilot fuel injection. The initial pilot fuel injector 20 was an injector (not shown) which employs two holes with an included spray angle of 70° between the plumes oriented at an angle of 18° below the cylinder head 22. Initial tests were run with pilot injection ranging from 25 to 115° before top dead center (BTDC) for pilot injections ranging from 10% to 30% of the fuel volume. While the initial staged injection experiments showed the staged injection was a successful means of controlling ignition of low cetane number fuels, the results were not entirely satisfactory.

It was believed that the spray from the pilot injector using the two pencil hole nozzles at an angle of 18° from the head was impinging upon the liner wall 24 of the cylinder 12 due to the low cylinder pressure and low piston 14 position, particularly at advanced injection timings BTDC.

Additional experiments were run attempting to improve low cetane performance by modifying the pilot injection spray pattern. Thus, a one-hole spray pattern with a spray angle of 48° below the cylinder head 22 was selected using the pencil injector 20. This injector 20 provided a spray pattern 26 designed to prevent wetting of the liner 24 at injection timings up to 115° BTDC and was directed toward but was not intended to impact the piston 14.

Figure 2:
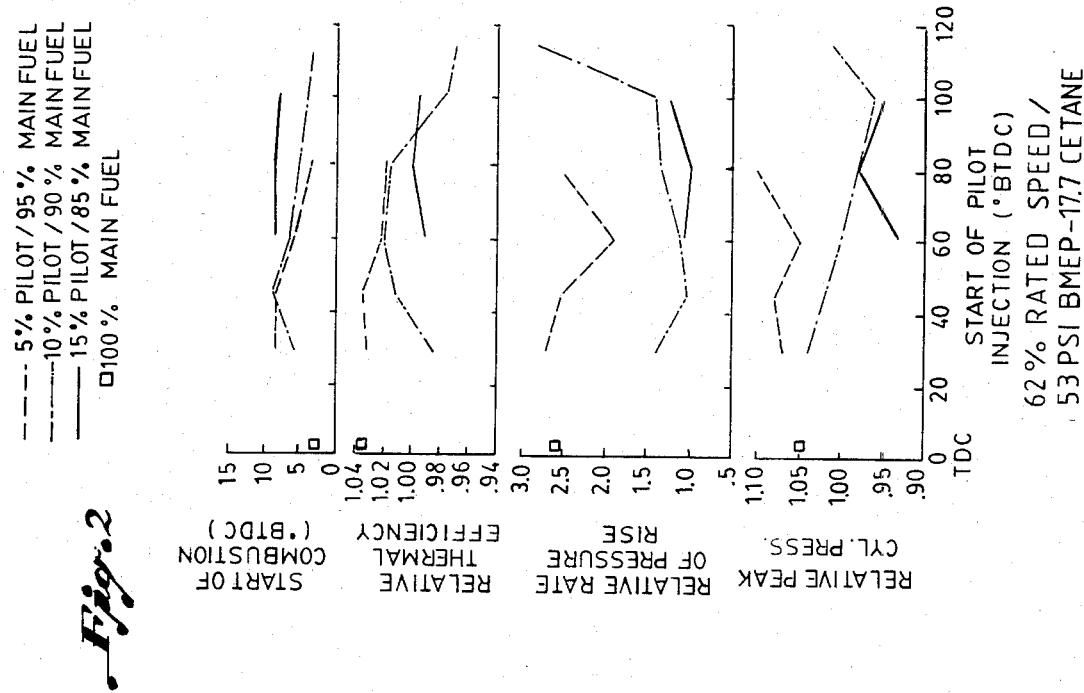
FIG. 2 is a plurality of graphs illustrating the relationship between the start of pilot injection, and relative (relative to No. 2 diesel fuel operation) peak cylinder pressure, relative rate (relative to No. 2 diesel fuel operation) of pressure rise, relative thermal efficiency (relative to No. 2 diesel fuel values), and start of combustion using a 17.7 cetane fuel at 62% of rated speed/53 psi bmep.

The modification to the pilot injector 20 resulted in marked improvements in low cetane performance. Again, injection of a small portion of a low cetane fuel as the pilot stage very effectively reduced knocking; however, far less pilot fuel was necessary to achieve the same results as compared to the two-hole spray pattern type injector initially tried. The main fuel injector 16 and the pilot fuel injector 20 can be entirely separate injectors or can be one integrated injector In FIGS. 2, 3 and 4, the pilot and main fuel injections were the same fuel. Referring to FIG. 2, a graph of the operating characteristics of the engine at 62% of rated speed/153 psi bmep and 17.7 cetane fuel at various pilot injection volumes is shown. The improved injector 10 permitted operation on a 17.7 cetane number blend wherein with the previous injector 24.0 cetane number fuel was the lowest level that was able to be operable. Performance at 62% rated speed using 15% pilot was excellent. Knocking was virtually eliminated and thermal efficiency was equal to the baseline value (value of No. 2 diesel). Knocking was a problem at lower pilot percentages, and varied in intensity with the pilot injection timing. This was undesirable since the lowest pilot percentages produced the highest thermal efficiencies. Less pilot fuel was needed when operating on fuels of higher cetane numbers.

At 17.7 cetane operation, performance at 10% of rated speed was not as smooth as 62% of rated speed, but was close to baseline levels. Rates of pressure rise were reasonably low when using 15% pilot, but cyclic combustion irregulaties generated higher audible noise levels than baseline No. 2 diesel fuel. At 100% of rated speed, thermal efficiency was within 1% of the diesel fuel baseline at the best combination of 15% pilot at 100° BTDC injection timing. The combustion irregularities encountered could possibly be eliminated by increasing the pilot percentage to 20%.

Figure 4:
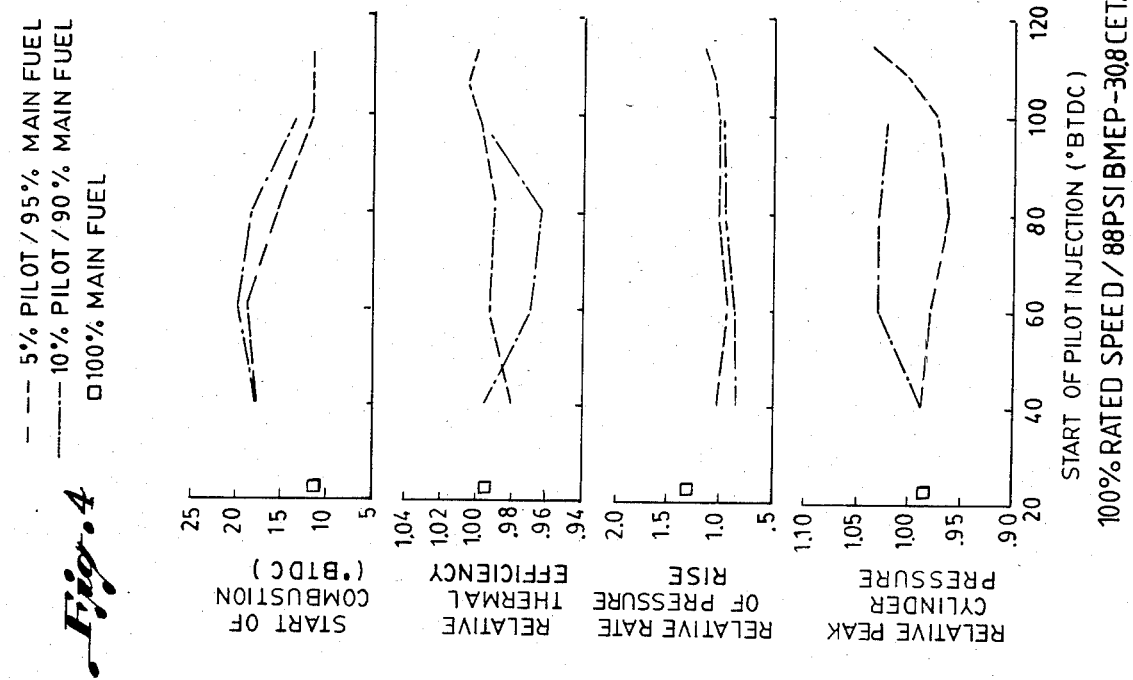
FIG. 4 is a series of graphs similar to FIGS. 2 and 3 but using a 30.8 cetane fuel at 100% of rated speed/88 psi bmep.
Figure 3:
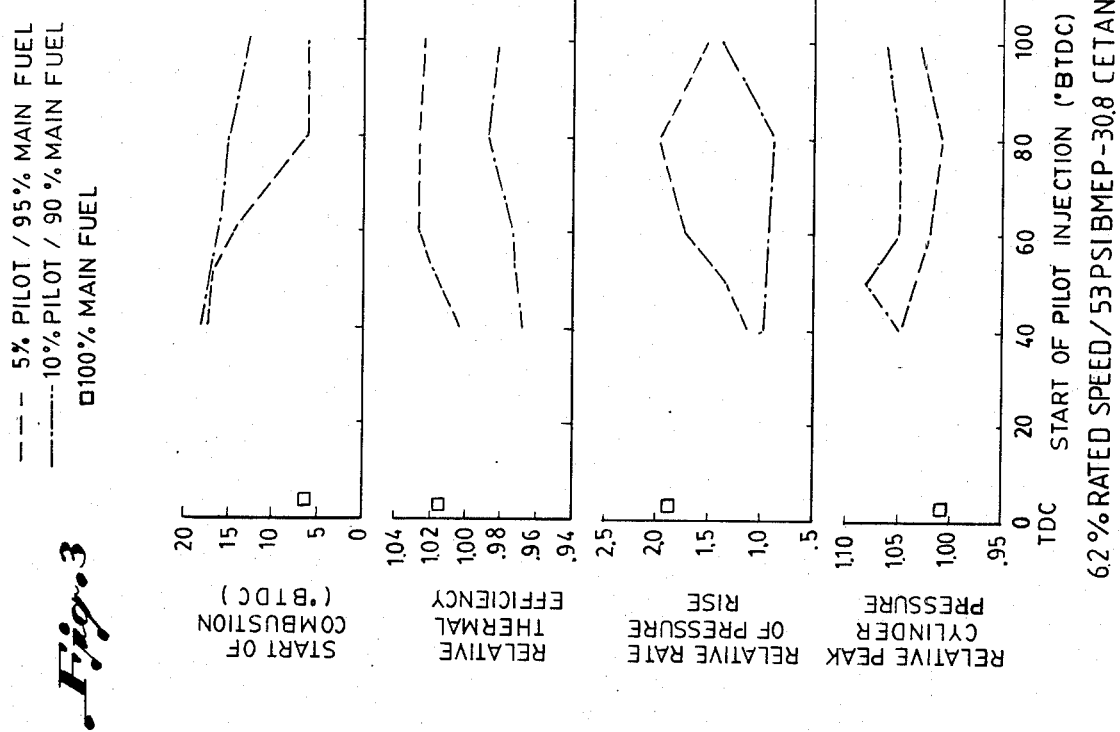
FIG. 3 is a plurality of graphs similar to FIG. 2 but using a 30.8 cetane fuel at 62% of rated speed/53 psi bmep.

FIGS. 3 and 4 illustrate the performance plots for 30.8 cetane fuel at 62% and 100% of rated speed, respectively. FIG. 4 illustrates that a 5% pilot charge produced cylinder pressure characteristics and thermal efficiencies comparable to the baseline diesel fuel with a 30.8 cetane blend at 62% rated speed while in the previous initial test using the two-hole pilot injector, 20% pilot charge was required to match these performances. Knocking could be eliminated by using a 5% pilot at 62% rated speed and a 10% pilot at 100% rated speed. Pilot injection timings of 60° and 115° BTDC provided the best combination of thermal efficiency and smooth combustion at 62% and 100% of rated speed, respectively. Thermal efficiency at 62% or rated speed was approximately 2% over No. 2 diesel fuel base line, but was 2% below No. 2 diesel fuel at 100% rated speed.

With regard to 24.0 cetane fuel, the same pilot percentages and injection timings that worked well on 30.8 cetane fuel also handled the 24.0 cetane fuel. Smooth combustion without signs of knocking was achieved at both 62% and 100% rated speed. Thermal efficiencies were of the same levels as the 30.8 cetane fuel.

Qualitatively, the results of the stage injection experiments on the low cetane number blends looked quite promising. The diesel engine was able to operate on fuels with cetane numbers as low as 17.7 without knocking and with reasonable good thermal efficiency. The success of staged injection of a low cetane number fuel depends upon the ability to compression ignite the pilot charge at the appropriate time in the cycle and to have the charge burn at a sufficiently high rate to ignite the main charge. A low cetane number pilot must be injected early to overcome the increased ignition delay. The problem is compounded in that the compression temperatures are lower at the earlier ignition timing, further extending the ignition delay. The injection timings that proved most successful ranged from 60° to 115° BTDC.

However, simply injecting a small amount of pilot fuel early, without regard for the fuel-air mixing process, leads to uncertain results. The fuel injected early must not come in contact with cold walls 24 or be trapped in quench regions of the combustion chamber, since this effectively stops the chemical reaction of fuel and air. In addition, the early injection of fuel must be stratified within the combustion chamber; that is, the early injection must have limited mixing with the combustion chamber air during a period of time between the early injection event and the onset of combustion. This is evident in the lower speed positions. For a given pilot quality, the pilot injection timing can be advanced to the point where the pilot is no longer effective as best seen in FIG. 2; and thermal efficiency and combustion characteristics rapidly decline. The timing at which this occurs advances as the pilot quantity increases. Thus, both pilot fuel quantity and injection timing affect stratification of the fuel. The larger the pilot quantity, the longer it takes to disperse the fuel and mix it with air to obtain a mixture too lean to readily ignite. This stratified pilot fuel process differs significantly from prior Vigom injection or fumigation processes which produce homogeneous fuel-air mixtures. The present injection process differs from conventional retarded timings in that the mixing of the fuel and air must be limited rather than promoted.

The use of the one hole pencil nozzle 20 for pilot injection with a very deep spray pattern (spray oriented 48° below the cylinder head 22) proved very effective in the particular engine tested, especially when compared with the two hole pencil nozzle having more conventional spray angles. The deep spray orientation of the one hole nozzle prevents spray impingement on the liner wall 24 which is believed to have occurred when using the two hole pencil nozzle at the extremely advanced pilot timings. The deep injection angle has additional benefits. In all diesel engines, the air within the combustion chamber 12 rotates about the longitudinal axis 30 of the chamber 12 to a greater or lesser extent, depending upon engine speed and design of the intake air ports. Fuel injected into the swirling air rapidly becomes mixed with the air due to the turbulence that accompanies the motion of the air. This rapid mixing may be detrimental to early pilot injection. If the fuel-air mixture becomes excessively fuel lean, the early injection is not effective in promoting the ignition of the main fuel charge 28. However, if the early injection is placed along the longitudinal axis 30 where the air velocity and turbulence in the combustion chamber is at a minimum, the mixing rate is reduced. The reduced mixing increases the energy density (temperature) of the ignited pilot mixture promoting rapid pilot burning and effective ignition of the main charge 28. The center 30 of the combustion chamber 12 is the preferred location for the early injection of the fuel charge 26 for another reason. Due to heat flow from the air mass in the chamber 12, the air temperature in the center of the chamber 12 is higher than at the chamber periphery 24. Injection of the early fuel 26 into the hotter center of the chamber 12 would reduce the ignition delay of the early fuel, aiding in the ignition of a low cetane pilot charge 26. Also, the reduced ignition delay allows later injection of the earlier fuel charge 26, leaving less time between the injection and ignition for the fuel 26 to become mixed with the air to excessively fuel-lean mixtures.

The design of the pilot fuel nozzle will depend on many factors, such as nozzle location in the combustion chamber, air swirl ratio, combustion chamber shape, compression pressure and fuel density and viscosity. As a result, the number of pilot spray holes, their angles and their size, and pilot injection pressure will differ depending on engine design and are best determined experimentally.

The timing angle, and the amount of fuel injected as the pilot of the initial charge 26 is a variable for any given engine, depending upon the engine speed and load. At high speed and high load, the temperature of the combustion air is relatively high which tends to require initial injection later than at lower speeds and loads. Additionally, at high speeds the rotational velocity of the air is high which enhances the mixing process and also tends to require later injection of the initial stage. On the other hand, at high engine speeds the number of degrees the crank shaft turns in a given period of time is larger, and even though the time between injection of the early fuel 26 and the ignition may be shorter, the number of crank degrees may be larger. Thus the optimum injection timing for the early fuel charge 26 is best determined experimentally.

The present invention, therefore, is well adapted to carry out the objects and obtain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. In a diesel engine using fuels having a lower cetane number than No. 2 diesel fuel in which the engine includes a main fuel injector and a pilot fuel injector which injects pilot fuel into the engine between 20° to 180° before top dead center, the improvement in the pilot fuel injector comprising, said pilot fuel injector directed towards the center line of the diesel cylinder and at an angle to be directed toward top of the piston, but avoiding the walls of the cylinder to stratify the injected fuel for reducing the fuel-air mixing rate, preventing loss of pilot fuel to quench zones, keeping the fuel-air mixture from becoming too fuel lean and injecting the fuel into the higher temperature in the center of the chamber.

2. The apparatus of claim 1 wherein the pilot fuel injector has a single hole for injection of the fuel.

3. The apparatus of claim 1 wherein the pilot fuel injector is directed at approximately 48 degrees below the head of the cylinder.

4. In a diesel engine using fuels having a lower cetane number than No. 2 diesel fuel in which the engine includes a cylinder and piston and a main fuel injector and a pilot fuel injector in which the pilot fuel injector injects pilot fuel into the engine between 20 degrees to 180 degrees before top dead center, the improvement in the pilot fuel injector comprising, said pilot nozzle having a single hole directed downwardly towards the center of the chamber at an angle to be directed toward the top of the piston to stratify the injected fuel for reducing the fuel-air mixing rate, preventing loss of pilot fuel to quench zones, keeping the fuel-air mixture from becoming too fuel lean and injecting the fuel into the higher temperature in the center of the chamber.

* * * * *